(12) United States Patent
Adams

(10) Patent No.: US 6,732,426 B2
(45) Date of Patent: May 11, 2004

(54) FIBER EXTRACTION TOOL

(75) Inventor: Terry Lee Adams, Huntington Beach, CA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 10/116,493

(22) Filed: Apr. 3, 2002

(65) Prior Publication Data

US 2003/0190133 A1 Oct. 9, 2003

(51) Int. Cl.[7] .................................................. B23P 19/00
(52) U.S. Cl. ................................ 29/762; 29/729; 29/739
(58) Field of Search .......................... 29/764, 768, 739, 29/758, 278, 280, 629, 426.5, 729, 762; 439/748

(56) References Cited

U.S. PATENT DOCUMENTS 3,802,049 A * 4/1974 Hennessey, Jr. .............. 29/764
5,161,301 A * 11/1992 Kilsdonk ..................... 29/739

* cited by examiner

Primary Examiner—John C. Hong
(74) Attorney, Agent, or Firm—Roger C. Turner

(57) ABSTRACT

An extraction tool (100) not only releases an optical fiber terminus (20) from a retainer clip (62) so the terminus can be moved rearwardly out of the connector, but also retracts the terminus without applying tension to the optical fiber (52) or force to the tip (32) of the optical fiber. The tool includes inner and outer tubes (104, 102), the inner tube having a front portion (110) forming a plurality of fingers (120) with front ends (124) that can grasp the terminus body. After the inner tube has been inserted into place, the outer tube is slid forwardly past the inner tube to expand the tines (64) of the retainer clip and prevent the fingers of the inner tube from expanding. Without sliding the tubes relative to each other, the inner and outer tubes are pulled rearwardly out of the connector passage to withdraw the terminus without pulling on the optical fiber.

8 Claims, 2 Drawing Sheets

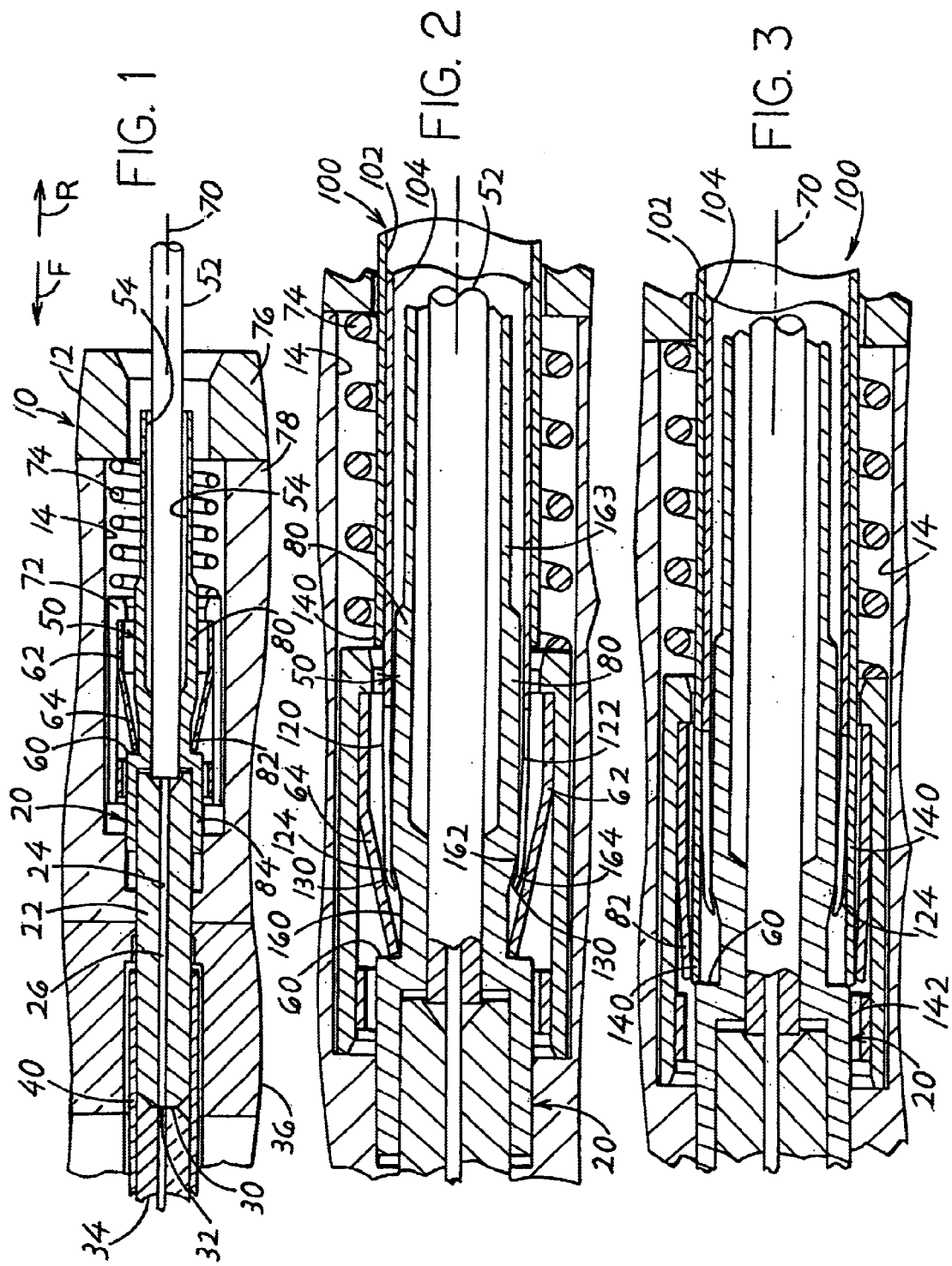

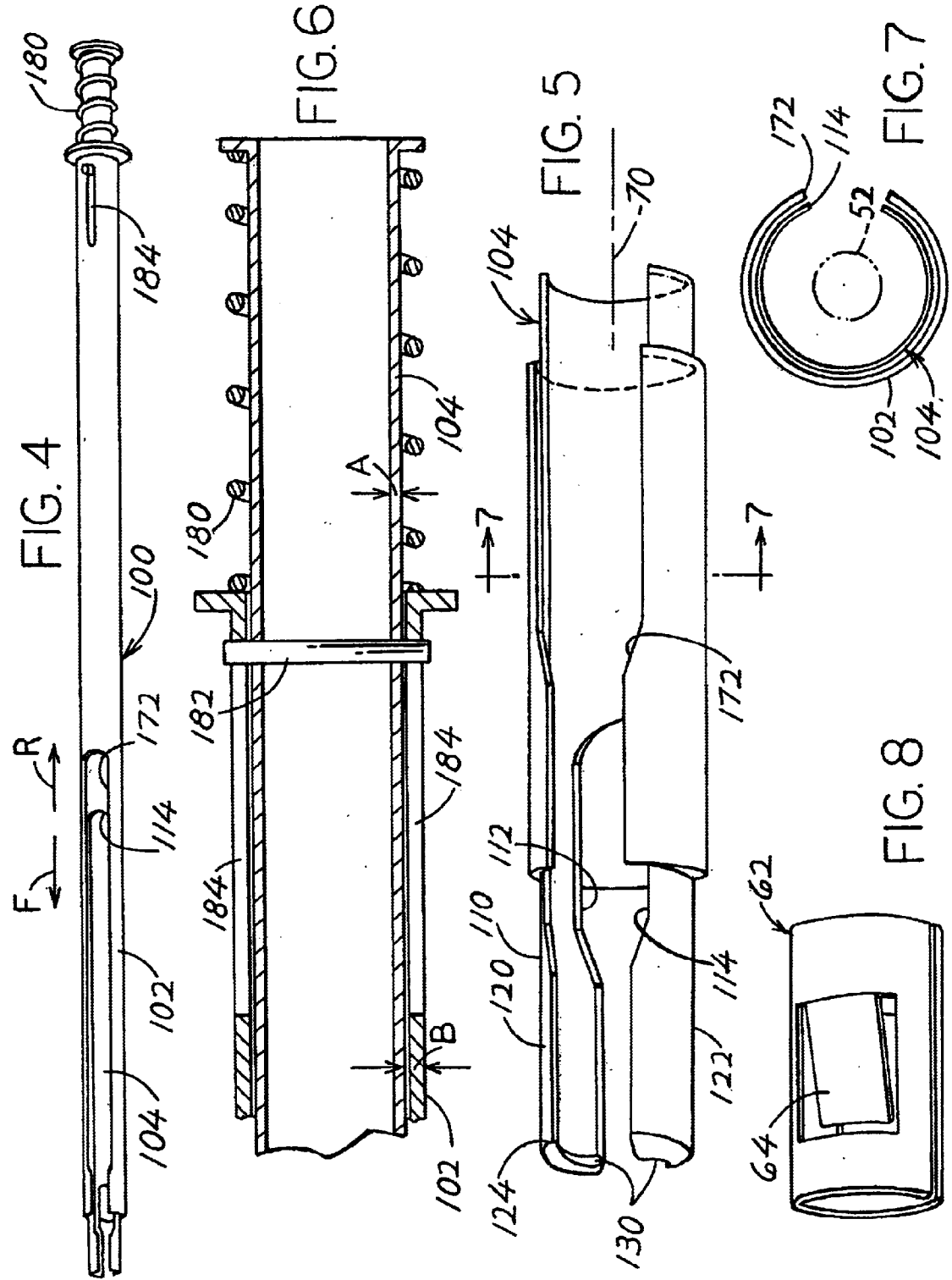

FIBER EXTRACTION TOOL

BACKGROUND OF THE INVENTION

A common type of optical fiber connector includes passages that receive optical fiber termini. A retainer clip has tines that abut a shoulder on the terminus body to retain it. The terminus can be removed by sliding a tubular extraction tool into the passage to expand the tines of the clip. The terminus and tube then are rearwardly moved together out of the passage by applying a rearward force to the terminus body. Such rearward force can be applied by pulling on the optical fiber that extends rearward from the terminus, or pushing rearwardly against the tip of the terminus. The optical fibers are very delicate, and a rearward pull on them can damage them. Although the front end of the terminus is usually exposed during terminus extractions so it can be pushed rearwardly, a hand or other instrument that pushes against the front end of the terminus body may scratch the tip of the optical fiber that is usually flush with the front end of the terminus. An extraction tool that released a terminus body from a retention clip and that applied force to the terminus body to remove it, without requiring that tension force be applied to the optical fiber or that the tip of a terminus be pressed rearwardly, would of value.

SUMMARY OF THE INVENTION

In accordance with one embodiment of the present invention, an optical fiber extraction tool is provided which enables extraction of an optical fiber terminus by releasing the terminus body from a retention clip and applying a rearward force to the terminus body, which extracts the terminus without requiring tension forces to be applied to the optical fiber or pushing forces to be applied to the front tip of the terminus. The extraction tool includes inner and outer tubes, with the inner tube having a front portion forming a plurality of fingers with free front ends. The inner tube can be inserted until the fingers of the inner tube lie around a portion of the terminus body that lies behind the rearwardly-facing shoulder of the body that engages tines of the retention clip. Then, the outer tube is moved forwardly to a front position relative to the inner tube, wherein the front end of the outer tube substantially abuts the body shoulder and expands the tines so their tips lie out of line with the body shoulder. In the front position of the outer tube, the outer tube closely surrounds the fingers of the inner tube to prevent them from expanding. As a result, the front ends of the inner tube fingers grip the body so when the outer and inner tubes are moved as a unit rearwardly out of the passage, the front ends of the inner tube fingers pull the terminus body out of the passage. Such removal of the terminus is accomplished by rearward forces applied only to the terminus body at a location rearward of the body shoulder, by the fingers of the inner tube.

The free front ends of the inner tube are preferably bent to extend at forward and radially inward inclines. It is common to form the terminus body with a neck lying immediately rearward of the body shoulder. The inwardly-incline finger front ends lie in the neck and grasp the neck to pull it out. The outer tube prevents the fingers from deflecting radially outwardly, so they continue to grip the rear of the neck of the terminus body to pull it out.

The novel features of the invention are set forth with particularity in the appended claims. The invention will be best understood from the following description when read in conjunction with the accompanying drawings.

BRIEF DESCRIPTION OF THE DRAWINGS

FIG. 1 is a sectional view of a portion of an optical fiber connector, shown mated to another optical fiber connector.

FIG. 2 is an enlarged view of a portion of the connector of FIG. 1, and of an extraction tool, showing the extraction tool in the course of its insertion into position.

FIG. 3 is a view similar to FIG. 2, but with the extraction tool fully inserted into the passage, and ready for removal of the terminus.

FIG. 4 is a side elevation view of the entire extraction tool of FIGS. 2 and 3.

FIG. 5 is an enlarged isometric view of a front portion of the extraction tool of FIG. 4.

FIG. 6 is a sectional view of the rear portion of the extraction tool of FIG. 4.

FIG. 7 is a sectional view taken on line 7—7 of FIG. 5, and showing, in phantom lines, an optical fiber lying therein.

FIG. 8 is an isometric view of one form of retention clip which is shown in the connector of FIGS. 1–3.

DESCRIPTION OF THE PREFERRED EMBODIMENTS

FIG. 1 illustrates a portion of an optical fiber connector 10 which includes a housing 12 with passages 14 and an optical fiber terminus 20 in each passage. The terminus includes a ferrule 22 with a bore 24 that holds a thin optical fiber element 26. The ferrule and fiber element have tips 30, 32 that are flush and polished. A ferrule 34 of another terminus is coupled to the terminus 20 by abutting their tips. The ferrules lie in an alignment frame 36 that lies forward of housing 12 and that holds a precision tube 40 in which the ferrules are positioned for alignment.

The terminus 20 includes a body 50. An optical fiber cable or optical fiber 52 has a jacket that is stripped away around the optical fiber element 26. The fiber 52 with the jacket therein lies in a bore 54 of the body, and is fixed therein by a potting compound such as epoxy (not shown). The body has a rearwardly R facing shoulder 60, and the connector includes a retention clip 62 with resilient tines 64. The tines are biased to extend in a forward F and radially inward direction towards the axis 70 of the body. The clip 62 lies in a clip holder 72 that can slide within the passage 14. A spring 74 biases the terminus forwardly against the ferrule 34 of the mating terminus. It is noted that the other terminus does not require a spring 64 or a clip holder. The particular housing 12 includes two parts 76, 78.

Occasionally, a terminus 20 must be removed from the connector housing. In the past, this was accomplished by inserting a retraction tool in the form of a thin-walled tube, forwardly until the front end of the tube abutted the shoulder 60. The tube expanded the front ends of the retention clip tines 64 so they were out of line with the shoulder 60. That is, the front ends 82 of the tines were further from the axis 70 than the perimeter of the shoulder 60, so the shoulder 60 and the rest of the terminus could be moved rearwardly out of the housing passage 14. Even with the clip tines expanded, a substantial force is required to move the terminus rearwardly out of the housing, especially because the tines 64 press firmly against the outside surface of the body front portion 84. One way to apply such rearward force was to pull the rear of the fiber 52. This had the disadvantage that it could damage the delicate fiber. Another way was to disconnect the connector 10 from the mating other connector and push rearwardly against the tip 30 of the terminus ferrule 22. This has the disadvantage that any force applied to the tip of the terminus could damage the tip of the ferrule or the tip of the optical fiber element by creating even a small scratch. The tips, 30, 32 are precisely polished, and slight damage can be important.

In accordance with the present invention, applicant removes the terminus 20 by the use of an improved extraction tool, of the construction shown at 100 in FIG. 4. The extraction tool 100 includes outer and inner tubes 102 and 104. The outer tube 102 is of the same construction as is presently used for extracting optical fiber termini by expanding the clip tines and then pulling on the fiber. The inner tube 104 can apply force to pull out the terminus without pulling on the optical fiber.

As shown in FIG. 5, the inner tube 104 has a front portion 110 with slots 112, 114 that result in fingers 120, 122 having free front ends 124. Applicant prefers to deform the finger front ends to form projections 130 that extend at radially inward and forward inclines.

FIG. 2 shows a first step in the use of the extraction tool 100. The inner and outer tubes 104, 102 are inserted forwardly into the passage 14 and closely around the body rear portion 80. It is noted that the front end 124 of the inner tube fingers 120, 122 lie forward of the front end 140 of the outer tube. The inward projections 130 of the fingers can grasp the rear portion 80 of the body, although in FIG. 2 if the inner tube were to be pulled rearward the fingers 120, 122 would expand and not grip the body.

A next step, shown in FIG. 3, is to slide the outer tube 102 forwardly until the front end 140 of the outer tube substantially abuts the body shoulder 60. The outside diameter of the outer tube front end is at least as great as the outside diameter of the body front portion 142 that forms the body shoulder. As a result, the outer tube expands the front ends 82 of the retention tines so they are out of line with the body shoulder and therefore do not prevent rearward movement of the body shoulder.

With the extraction tool 100 fully inserted as shown in FIG. 3, the two tubes 102, 104 are pulled rearwardly R out of the passage 14 without sliding one tube relative to the other. During initial rearward movement of the two tubes, the front ends 124 of the fingers tend to expand. However, the outer tube front portion 140 prevents such expansion of the finger front ends, and prevents more than minimal deflection of the fingers away from the axis 70. As a result, the finger front ends 124 push the terminus body 20 rearwardly as the extraction tool is pulled rearwardly out of the passage 14.

The terminus body 50 shown in FIG. 2 has a neck 160 extending rearward of the body shoulder, from the shoulder to about a location 162 where the body rear portion 80 has a constant diameter and then a decreased diameter. The neck has a tapered rear end at 164. The finger front ends 124 preferably engage the neck, and preferably the tapered portion 164. It is noted that when the extraction tool 100 of FIG. 2 is inserted, with the inner tube lying forward of the outer tube, the finger front ends at 124 abut the retention clip tines 64 about when the finger ends 124 engage the tapered rear end 164 of the neck, and this can be used to determine how far forward to initially insert the inner tube. Even if there is a sudden step between the smaller diameter of the neck and the larger diameter of the body rear portion rearward of the neck, the fingers would firmly grasp the body.

As shown in FIG. 5, the inner and outer tubes 104, 102 have slots 114, 172 along their front portions. A length of perhaps an inch or two of the optical fiber shown at 52 in FIG. 1, can pass into the slots 114, 172 so the tubes can fit around the optical fiber to fit into the passage of the connector. FIG. 7 shows that the slots 114, 172 have about the diameter of the optical fiber 52. It would be possible to not divide the front portion of the inner tube into two (or more) fingers, or finger parts 120, 122, but to use the inner tube front end as a single finger (with a finger rear end assumed to lie one diameter rearward of the front end). Such finger can have a bent front tip to grasp the body. However, a pair of fingers is preferred to better grip the body.

FIG. 6 shows that the outer tube 102 is biased towards a forward position relative to the inner tube 104. A spring 180 performs such biasing. A pin 182 which is fixed to the inner tube and which can slide within slots 184 at opposite sides of the outer tube, serves as an anti-rotation element that prevents rotation of the tubes relative to each other, and confines the outer tube to sliding a predetermined distance between its forward and rearward positions. FIG. 8 shows the construction of the retention clip 62, showing one of its two tines 64. It is noted that some connectors have a single plate that forms a plurality of clips with tines at each of a plurality of passages of a housing.

Although applicant prefers to bend the front ends of the fingers of the inner tube radially inwardly, it is noted that the fingers on the inner tube could grasp the terminus body even if they had only rough inner surfaces and the outer tube kept the fingers pressed against the terminus body.

Applicant prefers to construct the inner tube with thin tube walls that are no more than half the thickness of the outer tube walls. This is because the terminus body can be grasped by thin inner tube fingers, so long as the outer tube has thicker walls so it is stiff. In an extraction tool that applicant designed, the inner tube had a diameter of about thirty thousandths inch and a tube wall thickness A (FIG. 6) of two thousandths inch. The outer tube had a tube wall thickness B of five thousandths inch.

Thus, the invention provides an optical fiber extraction tool that not only expands the tines of a retention clip, but that also can grasp the terminus body and pull it out so that forces do not have to be applied directly to the optical fiber or the front end of the ferrule and fiber tip. This is accomplished by an extraction tool that includes inner and outer tubes, the inner tube having a front end forming one or a plurality of fingers with free front ends that can grasp the terminus body. The outer tube not only expands the tines, but prevents the fingers from deflecting radially outwardly. It is even possible to form the outer tube front end with slits so it compresses the finger front ends. With the fingers on the inner tube grasping the terminus body and the outer tube expanding the clip tines and preventing the fingers from expanding, applicant can pull out the extraction tool and thereby also pull out the terminus body from the connector passage. As mentioned above, even if the inner tube front portion were not divided into a plurality of fingers, its slot 114 forms at least one "finger" that allows the inner tube front portion to grasp the body.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. An optical fiber extraction tool for removing an optical fiber terminus rearwardly from a passage of an optical fiber connector, the terminus having an axis and including a body, the body having a body front portion forming a rearwardly-facing body shoulder and the body having a smaller diameter body rear portion that extends rearward of the body shoulder, wherein the connector includes a retainer clip with tines that extend at radially inward inclines toward the terminus axis and that have ends that abut the body shoulder to prevent rearward terminus removal until the tine ends are deflected radially outward, wherein the extraction tool includes an outer tube having a front portion with an outside diameter to radially outwardly deflect the tine front ends out of line with the body shoulder so the terminus can move rearwardly out of the connector passage, wherein:

said extraction tool includes an inner tube that lies within said outer tube said inner tube having a front portion that is radially deflectable, and said inner tube has means for gripping said body rear portion;

said outer tube is slideable between front and rear outer tube positions around said inner tube;

said outer tube front portion has an inside surface that lies adjacent to said inner tube front portion when said outer tube slides forward from said rear outer tube position to said front outer tube position, to limit radially outward deflection of said inner tube front portion and thereby allow said inner tube to grip said body to pull out said terminus.

2. The extraction tool described in claim 1 wherein:

said inner tube has an axis and said inner tube front portion has a plurality of slots that extend to extreme front tips of the inner tube front portion to divide said tube front portion into a plurality of fingers that are resilient and that have free front ends, said finger front tips form inwardly bent projections that form said means for gripping.

3. The extraction tool described in claim 1 wherein:

said inner tube front portion is divided into a plurality of resilient fingers with rear ends that are joined together and with free front ends, said front ends having extreme front end tips with projections that project at least partially radially inwardly and that have projection tips that lie closer together than said finger rear ends and form said means for gripping.

4. The extraction tool described in claim 1 wherein said outer tube has an axis, wherein:

said outer tube has a front end and in said outer tube front position said outer tube front end lies forward enough to be at least even with a front end of said inner tube, and said outer tube is slideable rearwardly until its front end is rearward of said inner tube front end.

5. A terminus extraction tool, comprising:

inner and outer tubes having substantially concentric axes, said inner tube having a front end and having a radially deflectable front portion;

said outer tube being slideable around said inner tube between a front position of said outer tube wherein an outer tube front end lies at least as far forward as said inner tube front end, and a rear position of said outer tube wherein said outer tube front end lies rearward of said inner tube front end;

said outertube front portion closely surrounding said inner tube front portion in said outer tube front position.

6. The extraction tool described in claim 5 wherein:

said inner and outer tubes have aligned axially-extending slots for receiving a length of optical fiber;

said outer tube front portion has an average wall thickness that is at least twice as great as an average wall thickness of said inner tube front portion.

7. The extraction tool described in claim 5 wherein:

said inner tube front portion forms a plurality of fingers having free front ends;

said finger free front ends have tips that are bent to extend at radially inward inclines.

8. An extraction tool for removing a terminus rearwardly from a passage of a connector, the terminus having an axis and including a body, the body having a body front portion forming a rearwardly-facing body shoulder and the body having a smaller diameter body rear portion that extends rearward of the body shoulder, wherein the connector includes a retainer clip with tines that extend at radially inward inclines toward the terminus axis and that have ends that abut the body shoulder to prevent rearward terminus removal until the tine ends are deflected radially outward, wherein the extraction tool includes an outer tube having a front portion that holds the tine front ends in a radially outwardly deflected position wherein the tine front end lie out of line with the body shoulder so the terminus can move rearwardly out of the connector passage, wherein:

said extraction tool includes an inner tube that lies within said outer tube, said inner tube having a radially deflectable front portion that lies in a forward position wherein said inner tube front portion grips said body rear portion; and said outer tube front portion has an inside surface that closely surrounds said inner tube front portion to limit radially outward deflection of said inner tube front portion and keep said inner tube gripping said body, to thereby enable said inner tube to pull out said terminus.

* * * * *